(12) United States Patent
Kuehn et al.

(10) Patent No.: US 10,611,047 B2
(45) Date of Patent: Apr. 7, 2020

(54) CUTTING LENGTH DISPLAY DEVICE (71) Applicant: Robert Bosch GmbH, Stuttgart (DE)

(72) Inventors: Thorsten Kuehn, Stuttgart (DE); Thomas Ziegler, Steinheim an der Murr (DE); Michael Wall, Stuttgart (DE); Joerg Maute, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 15/772,754

(22) PCT Filed: Oct. 24, 2016

(86) PCT No.: PCT/EP2016/075488
§ 371 (c)(1),
(2) Date: May 1, 2018

(87) PCT Pub. No.: WO2017/076672
PCT Pub. Date: May 11, 2017

(65) Prior Publication Data
US 2018/0319035 A1     Nov. 8, 2018

(30) Foreign Application Priority Data

Nov. 4, 2015  (DE) .......................... 10 2015 221 631

(51) Int. Cl.
*B27B 9/02*     (2006.01)
*B23D 59/00*    (2006.01)

(52) U.S. Cl.
CPC .............. *B27B 9/02* (2013.01); *B23D 59/002* (2013.01); *B23D 59/003* (2013.01)

(58) Field of Classification Search
CPC ........ B23D 59/002; B23D 59/003; B27B 9/02
See application file for complete search history.

(56) References Cited

U.S. PATENT DOCUMENTS 6,951,057 B2 *  10/2005  Yoshida ................... B27B 9/02
                                                  30/376
9,925,684 B2 *   3/2018  Sinzig .................. B23D 59/002
(Continued)

FOREIGN PATENT DOCUMENTS

CN         101148048 A      3/2008
CN         101862858 A     10/2010
CN         104249350 A     12/2014
(Continued)

OTHER PUBLICATIONS

International Search Report corresponding to PCT Application No. PCT/EP2016/075488, dated Jan. 12, 2017 (German and English language document) (5 pages).

*Primary Examiner* — Jennifer B Swinney
(74) *Attorney, Agent, or Firm* — Maginot, Moore & Beck LLP (57) ABSTRACT

A cutting length display device for a hand-held machine tool includes at least one display unit and a cable system unit. The at least one display unit includes at least one movably mounted display element for displaying at least one position of a cutting edge of a machining tool on a workpiece configured to be machined depending on a set cutting depth of the machining tool. The cable system unit is configured to change a position of the at least one display element depending on the set cutting depth of the machining tool.

11 Claims, 3 Drawing Sheets

(56) References Cited

U.S. PATENT DOCUMENTS

| | | | | |
|---|---|---|---|---|
| 10,005,199 B2* | 6/2018 | Sinzig | ................ | B23D 59/002 |
| 2018/0272553 A1* | 9/2018 | Kuehn | ................ | B23D 59/003 |

FOREIGN PATENT DOCUMENTS

| | | |
|---|---|---|
| CN | 204035678 U | 12/2014 |
| CN | 104411435 A | 3/2015 |
| DE | 10 2011 086 334 A1 | 5/2013 |
| DE | 10 2012 219 397 A1 | 1/2014 |

* cited by examiner

CUTTING LENGTH DISPLAY DEVICE

This application is a 35 U.S.C. § 371 National Stage Application of PCT/EP2016/075488, filed on Oct. 24, 2016, which claims the benefit of priority to Serial No. DE 10 2015 221 631.4, filed on Nov. 4, 2015 in Germany, the disclosures of which are incorporated herein by reference in their entirety.

BACKGROUND

DC 10 2012 219 397 A1 has already disclosed a cutting length display apparatus for a power tool, which has a display unit, comprising a movably mounted display element, for displaying at least one position of a cutting edge of a machining tool on a workplace to be machined in dependence on a set cutting depth of the machining tool.

SUMMARY

The disclosure proceeds from a cutting length display apparatus for an in particular portable power tool, having at least one display unit, comprising at least one movably mounted display element, for displaying at least one position of a cutting edge of a machining tool on a workpiece to be machined in dependence on a set cutting depth of the machining tool.

What is proposed is that the cutting length display apparatus has a cable system unit, which is provided for changing a pose of the display element in dependence on the set cutting depth of the machining tool.

The display element has in particular in at least one operating state for displaying the position of the cutting edge a cutting edge display line extending at least substantially transversely to a movement plane of the display element and/or at least substantially transversely to a cutting plane of the machining tool on a workpiece to be machined. The display element can be mounted so as to be in particular translationally and/or rotationally movable.

Cutting edges of cutting teeth of the machining tool preferably extend at least substantially transversely to the cutting plane of the machining tool. "At least substantially transversely" is understood here to mean in particular an orientation of a plane and/or a direction relative to a further plane and/or a further direction, which preferably deviates from a parallel orientation of the plane and/or of the direction relative to the further plane and/or the further direction. The machining tool is preferably configured in the form of a circular saw blade. Consequently, the machining tool performs a rotating movement for providing a cut in the workpiece preferably in the cutting plane of the machining tool. The cutting plane preferably extends at least substantially transversely to a workpiece surface of the workpiece to be machined for providing a cut in the workpiece.

The cutting edge display line imaged on the workpiece in at least one operating state by the display element has a maximum length that is in particular longer than 2 mm, preferably longer than 5 mm, and with particular preference longer than 10 mm, or the cutting edge display line imaged by the display element on the workpiece in at least one operating state is formed by a transverse extent, in particular a diameter, of a light beam. In one configuration of the cutting edge display line as a transverse extent of a light beam, the cutting edge display line preferably has a maximum extent that is less than 2 mm. The cutting edge display line can be formed here by the display element itself or by a light beam produced and projected by the display element, in particular by a laser beam produced and projected by the display element. The cutting edge display line preferably shows at least one exit point or entry point of the machining tool, in particular of cutting edges of the machining tool, from or into a workpiece to be machined on a workpiece surface of the workpiece, at which the machining tool, upon reaching a set cutting depth during machining of the workpiece, would exit from the workpiece or would enter the workpiece, or exits from the workpiece or enters the workpiece, in particular in a manner decoupled from a displacement movement of the portable power tool on the workpiece surface of the workpiece. The display element images the cutting edge display line preferably at least substantially transversely, in particular at least, substantially perpendicularly, with respect to the cutting plane of the machining tool on the workpiece.

The display unit preferably has at least one further movably mounted display element, which has for displaying the position of a further cutting edge in particular in at least one operating state a further cutting edge display line extending at least substantially transversely to a movement plane of the display element and/or at least substantially transversely to a cutting plane of the machining tool. The further display element preferably images a further cutting edge display line on the workpiece, which corresponds to an entry point of the machining tool. The display element here preferably images a cutting edge display line on the workpiece, which corresponds to an exit point of the machining tool. With particular preference, it is possible to obtain a display of a length of a cut of the machining tool that may be made in the workpiece, in particular decoupled from a displacement movement of the portable power tool on the workpiece surface of the workpiece, in dependence on a set cutting depth of the machining tool.

A "cable system unit" in this context is understood to mean in particular a unit which has at least one cable provided for transferring at least one force. In particular, the cable system unit has at least one pull cable. A "pull cable" is understood to mean in particular a cable which is provided for influencing at least one in particular mechanical process by way of a traction movement. A "cable" is understood to mean in particular a long, flexible element. In particular, the cable can be formed from a plurality of in particular twisted natural fibers, synthetic fibers and/or wires or by a single fiber or a single wire or a belt. In addition to at least one cable, the cable system unit can in particular comprise further elements, for example fixed and/or movable pulleys, or further cables. A "pose of the display element" is understood to mean in particular an absolute or relative spatial position and/or an absolute or relative spatial orientation.

With a configuration of this type, it is possible to provide a cutting length display apparatus which permits advantageous display of a cutting edge display line. Furthermore, the cutting length display apparatus can be implemented in an advantageously compact, robust and/or cost-effective manner due to the use of a cable system unit.

It is furthermore proposed that the cable system unit has at least one cam element, which is mounted so as to be rotatable about an axis of rotation, and at least one pull cable, which is provided for inducing a rotational movement of the cam element by way of unwinding along at least one cam surface of the cam element. In addition, the pull cable is provided for inducing a rotational movement of the cam element in dependence on the set cutting depth of the machining tool and in particular during a setting process for setting a cutting depth of the machining tool. The rotational movement is provided for effecting a change in the pose of the display element. The cam element can in particular have an at least substantially plate-type configuration. The pull cable is in at least one operating state at least partially wound up on at least one section of the cam surface of the cam element. An end of the pull cable is attached fixedly to the cam element, in particular at the cam surface of the cam element. Unwinding of the pull cable along the cam surface is effected in particular by way of exerting a pull force onto the pull cable. The cable system unit in particular has a restoring element, in particular a restoring spring, which is provided for exerting a restoring force onto the cam element that acts counter to the rotational movement induced by the pull cable. As a result, it is possible in an advantageously simple and/or reliable manner to change a pose of the display element in dependence on the set cutting depth of the machining tool.

It is additionally proposed that at least two points on the cam surface of the cam element have different distances from the axis of rotation for achieving a change in a rotational speed of the cam element during a uniform movement of the pull cable. A rotational speed, in particular a change in the rotational speed, of the cam element in the case of a change in the cutting depth of the machining tool and a resulting movement of the pull cable is in particular dependent on a ratio of the distances of the at least two points from the axis of rotation. In particular, a rotational speed of the cam element diminishes during unwinding of the pull cable from the cam element as the unwound length increases. A ratio of the distances of the at least two points from the axis of rotation is in particular adapted to a movement profile, determined by a geometry of the machining tool, of the cutting edges of the machining tool in the case of a change in the cutting depth of the machining tool. In particular, an angle of rotation of the cam element about the axis of rotation changes during the winding up or unwinding of the pull cable, wherein a change of the angle of rotation is adapted to a movement profile, determined by a geometry of the machining tool, of the cutting edges of the machining tool in the case of a change of the cutting depth of the machining tool. As a result, an advantageously exact display of a position of a cutting edge of a machining tool can be obtained.

In a preferred configuration of the disclosure, it is proposed that the pull cable is guided at least sectionally over an outer contour of the cam element, which has different outer radii in at least one section. The outer contour in particular has at least one guide track, which is provided for receiving the pull cable in a wound-up state. The guide track can in particular have lateral delimitation walls, which are provided for preventing lateral slipping of the pull cable. The at least one section of the outer contour has in particular an arcuate profile, the outer radius of which continuously increases counter to an unwinding direction of the pull cable. As a result, a movement profile of the display element can be advantageously adapted to a movement profile of the cutting edges of a circular machining tool in the case of a change of the cutting depth of the machining tool.

In a further preferred configuration of the disclosure, it is proposed that the cam element has at least one in particular Archimedean spiral track, along which the pull cable is guided at least sectionally. The spiral track can have in particular lateral delimitation walls, which are provided for preventing lateral slipping of the pull cable. The spiral track in particular extends on a surface of the cam element arranged at least substantially perpendicularly to the axis of rotation of the cam element. One end of the pull cable is attached in particular at a center of the spiral that is formed by the spiral track. Unwinding of the pull cable is effected in particular from the outside to the inside along the spiral track. As a result, a movement profile of the display element can be advantageously adapted to a movement profile of the cutting edges of a circular machining tool in the case of a change of the cutting depth of the machining tool.

It is additionally proposed that the display element be connected to the cam element for rotation therewith. The display element being connected to the cam element "for rotation therewith" is in particular understood to mean that a torque and/or preferably a rotational movement of the cam element is transferred to the display element without being changed. In particular, the display element can be attached in particular to an outer contour of the cam element in an in particular non-positive and/or positive manner and/or be formed at least partially in one piece with the cam element, in particular with an outer contour of the cam element. As a result, it is possible in an advantageously simple and/or reliable manner to change a pose of the display element in dependence on the set cutting depth of the machining tool.

It is furthermore proposed that the cutting length display apparatus has at least one guide unit, with the display element being mounted such that it is displaceable along it. A "guide unit" is in particular understood to mean a unit which is provided for movably guiding the display element along a segment, preferably along a straight line. The guide unit in particular has at least one guide means, for example a guide rail. The guide means extends in particular at least substantially parallel with respect to a cutting plane of the machining tool. "Substantially parallel" is understood here to mean in particular an alignment of a direction relative to a reference direction, in particular in a plane, wherein the direction has a deviation with respect to the reference direction of in particular less than 8°, advantageously less than 5° and with particular advantage less than 2°. In particular, the guide unit can have at least one bearing, in particular a roller bearing, a ball bearing and/or a plain bearing, which is provided for reducing friction between the display element and the guide means. As a result, an advantageously flexible placement of the display element can be made possible. Use of different display elements, in particular display elements with light indicators and/or mechanical indicators, can furthermore be made possible.

It is furthermore proposed that the cable system unit has at least one further pull cable, which is provided for converting a rotational movement of the cam element into a movement of the display element along the guide unit. In particular, the further pull cable is at least partially wound onto a reel which is mounted so as to be rotatable about the axis of rotation of the cam element, in particular connected to the cam element for rotation therewith. In particular, one end of the second pull cable is fixedly connected to the display element. The cable system unit has in particular a deflection pulley which is provided for deflecting the second pull cable such that it runs at least sectionally at least substantially parallel with respect to a guide means of the guide unit. A rotational movement of the cam element effects in particular unwinding of the second pull cable from the reel or winding up of the second pull cable from the reel. In the case of the second pull cable being wound onto the reel, the second pull cable is in particular provided for exerting a pull force on the display element. The pull force exerted on the display element is in particular provided for moving the display element along the guide unit, in particular along a guide element of the guide unit. In particular, the cable system unit has at least one restoring spring, which is provided for exerting on the display element a force that acts counter to the pull force exerted by the second pull cable. As a result, it is possible in an advantageously simple and/or reliable manner to change a pose of the display element in dependence on the set cutting depth of the machining tool.

It is additionally proposed that the cable system unit has at least one tensioning pulley, which is provided for varying a pull length of the pull cable. In particular, a position of the tensioning pulley relative to the pull cable is changeable. As a result, it is possible for an advantageously simple adaptation to machining tools with different tool diameters to be effected.

In addition, it is proposed that the display unit is configured as a laser display unit. Consequently, the display element and the further display element are preferably configured in each case as a laser display element. The display element and the further display element are preferably configured as laser diodes. The display element and the further display element preferably project the cutting edge display line and the further cutting edge display line onto the workpiece to be machined in at least one operating state. Consequently, the display element images in at least one operating state a cutting edge display line, which extends at least substantially transversely to a movement plane of the display element and/or at least substantially transversely to a cutting plane of the machining tool, on a workpiece to be machined for displaying the position of the further cutting edge. Consequently, the further display element furthermore images in at least one operating state a further cutting edge display line, which extends at least substantially transversely to a movement plane of the display element and/or at least substantially transversely to a cutting plane of the machining tool, on a workpiece to be machined for displaying the position of the further cutting edge. It is possible to realize a particularly comfortably readable cutting length display apparatus.

Furthermore proposed is a power tool, in particular a portable power tool, in particular a circular saw, having at least one cutting length display apparatus according to the disclosure. A "portable power tool" is understood here to mean in particular a power tool, in particular a hand-held power tool, which can be transported by a user without a transport machine. The portable power tool has in particular a mass of less than 40 kg, preferably less than 10 kg and with particular preference less than 5 kg. With particular preference, the portable power tool is configured as a plunge saw. However, it is also feasible for the power tool to have a different configuration which appears sensible to a person skilled in the art. The power tool preferably has a cutting depth setting unit, which is provided for setting a cutting depth of the machining tool which is capable of being coupled to a tool holder of the portable power tool. The expression "cutting depth setting unit" is understood here to define in particular a unit which is provided for limiting a plunging distance of the machining tool connected to the tool holder of the portable power tool, in particular of a circular saw blade, into a workpiece to be machined and/or for setting a length of a plunging distance of the machining tool into the workpiece to be machined. The plunging distance of the machining tool into the workpiece to be machined is viewed here in particular in a direction that extends at least substantially perpendicularly to a placement surface of a placement unit of the portable power tool, by way of which the portable power tool is placed on a workpiece surface of a workpiece to be machined. The expression "substantially perpendicularly" is understood here in particular to define an orientation of a direction relative to a reference direction, wherein the direction and the reference direction, in particular viewed in a plane, enclose an angle of 90°, and the angle has a maximum deviation of in particular less than 8°, advantageously less than 5° and with particular advantage less than 2°. It is hereby possible to achieve advantageously precise machining of a workpiece using the portable power tool.

It is furthermore proposed that the cutting length display apparatus comprises at least the movement coupling unit which is provided for moving at least the display element in dependence on a movement of a cutting depth setting element of the cutting depth setting unit. The cutting depth setting element is configured particularly preferably as a depth stop, which delimits a plunging distance of the machining tool connected to a workpiece holder of the portable power tool, in particular of a circular saw blade, into the workpiece to be machined and/or by way of which a length of the plunging distance is settable. It is hereby possible to advantageously achieve coupling of the display element to the cutting depth setting element. Consequently, a setting of a position of the display element that is dependent on a position of the cutting depth setting element can advantageously be achieved. It is hereby possible to advantageously achieve a precise display of a cutting length of the machining tool in dependence on a set cutting depth of the machining tool.

The cutting length display apparatus according to the disclosure and/or the power tool according to the disclosure is/are not intended here to be limited to the above-described application and embodiment. In particular, the cutting length display apparatus according to the disclosure and/or the power tool according to the disclosure can have a number of individual elements, components and units that deviate from those mentioned here for fulfilling a function that is described here.

BRIEF DESCRIPTION OF THE DRAWINGS

Further advantages can be gathered from the following description of the drawing. In the drawing, exemplary embodiments of the disclosure are illustrated. The drawing, the description and the claims contain numerous features in combination. Expediently, a person skilled in the art will also consider the features individually and combine them to form meaningful further combinations.

In the figures.

DETAILED DESCRIPTION

Figure 1:
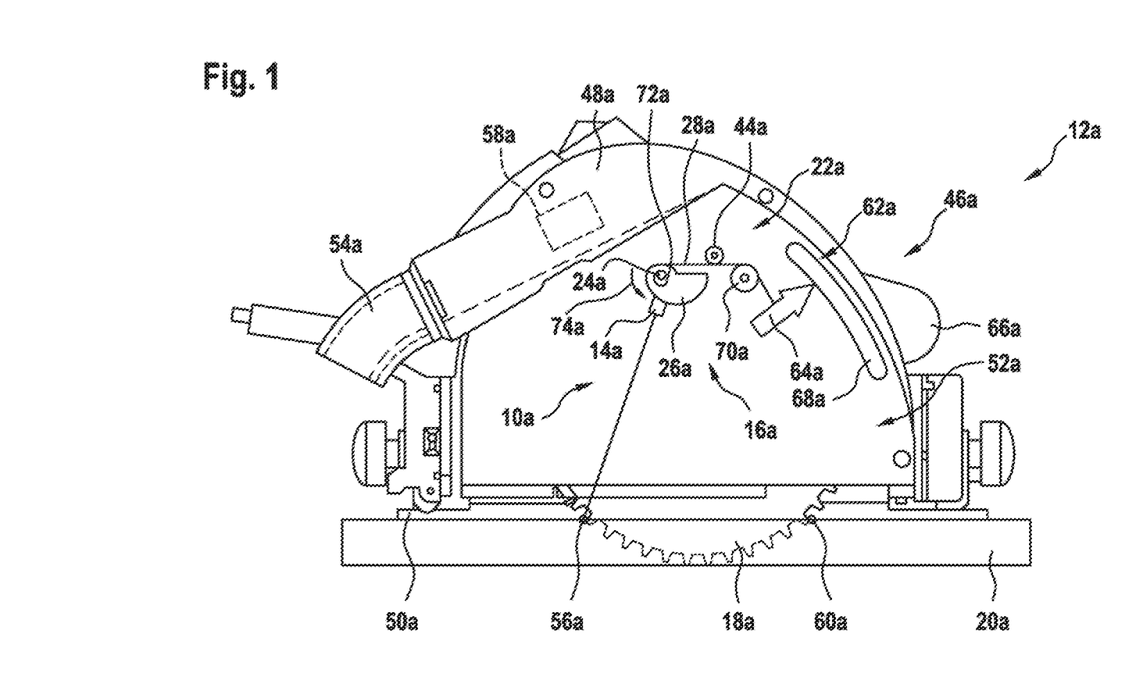
FIG. 1 shows a simplified illustration of a power tool having a cutting length display apparatus having a cable system unit.

FIG. 1 shows a simplified illustration of a portable power tool 12a which is configured as a circular saw, in particular a plunge saw. The portable power tool 12a, which is configured as a plunge saw, comprises a cutting depth setting unit 46a for setting a cutting depth of a machining tool 18a and at least one cutting length display apparatus 10a. It is possible by setting a position of a cutting depth setting element 66a to set a cutting depth of the machining tool 18a in a manner that is already known to a person skilled in the art. The machining tool 18a is connected to a workpiece holder (not illustrated in more detail here) of the portable power tool 12a. The portable power tool 12a furthermore comprises a power tool housing 48a, which is provided for enclosing a drive unit (not illustrated) of the portable power tool 12a. The drive unit comprises a drive shaft, which is provided for driving the machining tool 18a, which is capable of being coupled to the tool holder, in a manner that is already known to a person skilled in the art.

The portable power tool 12a furthermore comprises a placement unit 50a, which is configured as a base plate or as a slide shoe, by way of which the portable power tool 12a is placed on a workplace surface of the workpiece 20a during machining of a workpiece 20a or glides on the workpiece surface during a movement for making a cut in the workpiece 20a. Additionally arranged on the placement unit 50a is a protection unit 52a of the portable power tool 12a, which is provided for protecting a user against injury when machining the workpiece 20a. The protection unit 52a is configured here as a protective hood that encloses the machining tool 18a in an installed state in a direction of rotation of the drive shaft by more than 160°. The protection unit 52a furthermore has a suction coupling element 54a, which is connectable to a suction unit (not illustrated in more detail here) for sucking up removed workpiece particles during machining of the workpiece 20a.

The cutting length display apparatus 10a for the portable power tool 12a has at least one display unit 16a, which comprises at least one display element 14a which is mounted so as to be movable, for displaying at least one position of a cutting edge of the machining tool 18a on the workpiece 20a to be machined in dependence on a set cutting depth of the machining tool 18a. The cutting depth of the machining tool 18a is settable using the cutting depth setting unit 46a. The display unit 16a preferably has at least one further movably mounted display element (not illustrated here), which is provided for displaying in at least one operating state at least one position of a further cutting edge of the machining tool 18a. The further display element is preferably at least substantially identical to the display element 14a. The display unit 16a is configured as a laser display unit. The display element 14a is configured as a laser display element. The display element 14a images in at least one operating state a cutting edge display line 56a, which extends substantially transversely to a cutting plane of the machining tool 18a, on the workpiece 20a to be machined for displaying the position of the cutting edge. The cutting edge display line 56a of the display element 14a is formed here by a laser line. The display element 14a is supplied with energy by an energy unit 58a of the cutting length display apparatus 10a or of the portable power tool 12a for producing a laser beam. Here, the energy unit 58a can be formed by a separate battery pack, or the energy unit 58a is electrically connected electrically to an energy supply unit (not illustrated in more detail here) of the portable power tool 12a.

The cutting edge display line 56a, which is imaged by the display element 14a on the workpiece 20a, is provided for displaying a position of a rear cutting edge of the machining tool 18a on the workpiece 20a to be machined, as viewed in a direction that extends counter to a movement direction of the portable power tool 12a for making a cut in the workpiece 20a. The rear cutting edge of the machining tool 18a corresponds to a rear exit edge of cutting edges of the machining tool 18a from the workplace 20a to be machined when a cutting depth of the machining tool 18a that is set using the cutting depth setting unit 46a has been reached. A cutting edge display line 60a, which is imaged on the workpiece 20a by the further display element, can in particular be provided for displaying a position of a front cutting edge of the machining tool 18a on the workpiece 20a to be machined, as viewed in the direction that extends counter to the movement direction of the portable power tool 12a for making a cut in the workpiece 20a. The front cutting edge of the machining tool 18a corresponds to a front entry edge of cutting edges of the machining tool 18a in the workpiece 20a to be machined when a cutting depth of the machining tool 18a that is set using the cutting depth setting unit 46a has been reached.

Figure 2:
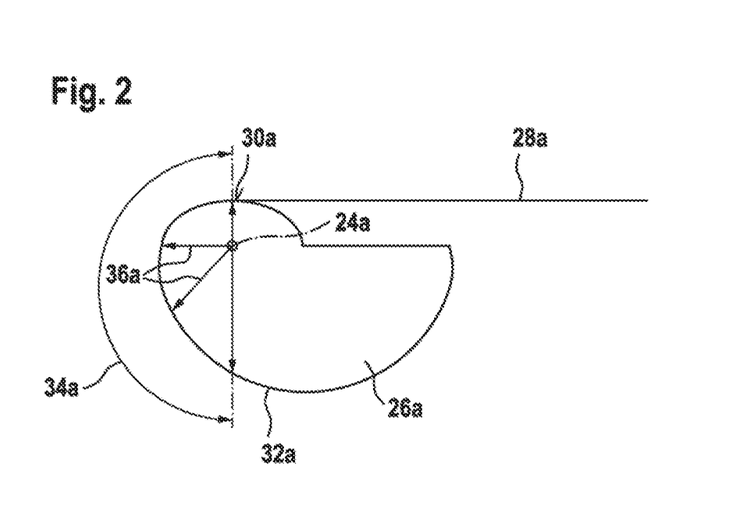
FIG. 2 shows a cam element of the cable system unit of FIG. 1.

The cutting length display apparatus 10a furthermore has a cable system unit 22a, which is provided for changing a pose of the display element 14a in dependence on the set cutting depth of the machining tool 18a. The cable system unit 22a has at least one cam element 26a, which is mounted so as to be rotatable about an axis of rotation 24a, and at least one pull cable 28a, which is provided for inducing a rotational movement of the cam element 26a by unwinding along at least one cam surface 30a of the cam element 26a. The cam element 26a has applied to it a restoring force 74a, acting counter to a pull direction of the pull cable 28a, by a restoring element 72a. The rotational movement of the cam element 26a is provided for effecting change in the pose of the display element 14a. At least two points on the cam surface 30a of the cam element 26a have different distances from the axis of rotation 24a for obtaining a change in a rotational speed of the cam element 26a during a uniform movement of the pull cable 28a. The pull cable 28a is guided at least sectionally over an outer contour 32a of the cam element 26a, which has different outer radii 36a in at least one section 34a (cf. FIG. 2). The display element 14a is connected to the cam element 26a for rotation therewith. In addition, the cable system unit 22a has a tensioning pulley 44a, which is provided for varying a pull length of the pull cable 42a, as a result of which the display unit 16a can be adapted to machining tools 18a having different diameters.

The cutting length display apparatus 10a furthermore comprises a movement coupling unit 62a, which connects the cable system unit 22a of the display unit 16a to the cutting depth setting element 66a of the cutting depth setting unit 46a in a movement-dependent manner. One end of the pull cable 28a is connected to a movement coupling element 64a of the movement coupling unit 62a. The pull cable 28a is deflected between the cam element 26a and the movement coupling element 64a using a deflection pulley 70a. The cutting depth setting element 66a is mounted movably on a guide track element 68a of the cutting depth setting unit 46a for setting a cutting depth of the machining tool 18a. The guide track element 68a is arranged at the protection unit 52a. In the case of a movement of the cutting depth setting element 66a relative to the guide track element 68a, the movement coupling element 64a is likewise moved, due to the connection to the cutting depth setting element 66a, relative to the guide track element 68a along a profile of the guide track element 68a, as a result of which a movement of the pull cable 28a is effected. The movement of the pull cable 28a results in a rotational movement of the cam element 26a and an associated pivoting of the display element 14a. A pivoting of the further display element can be implemented in the same way.

Figure 3:
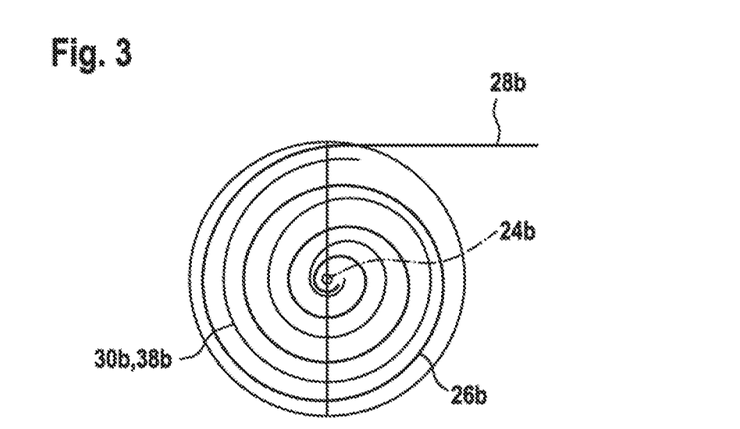
FIG. 3 shows an alternative cam element of a cable system unit.
Figure 4:
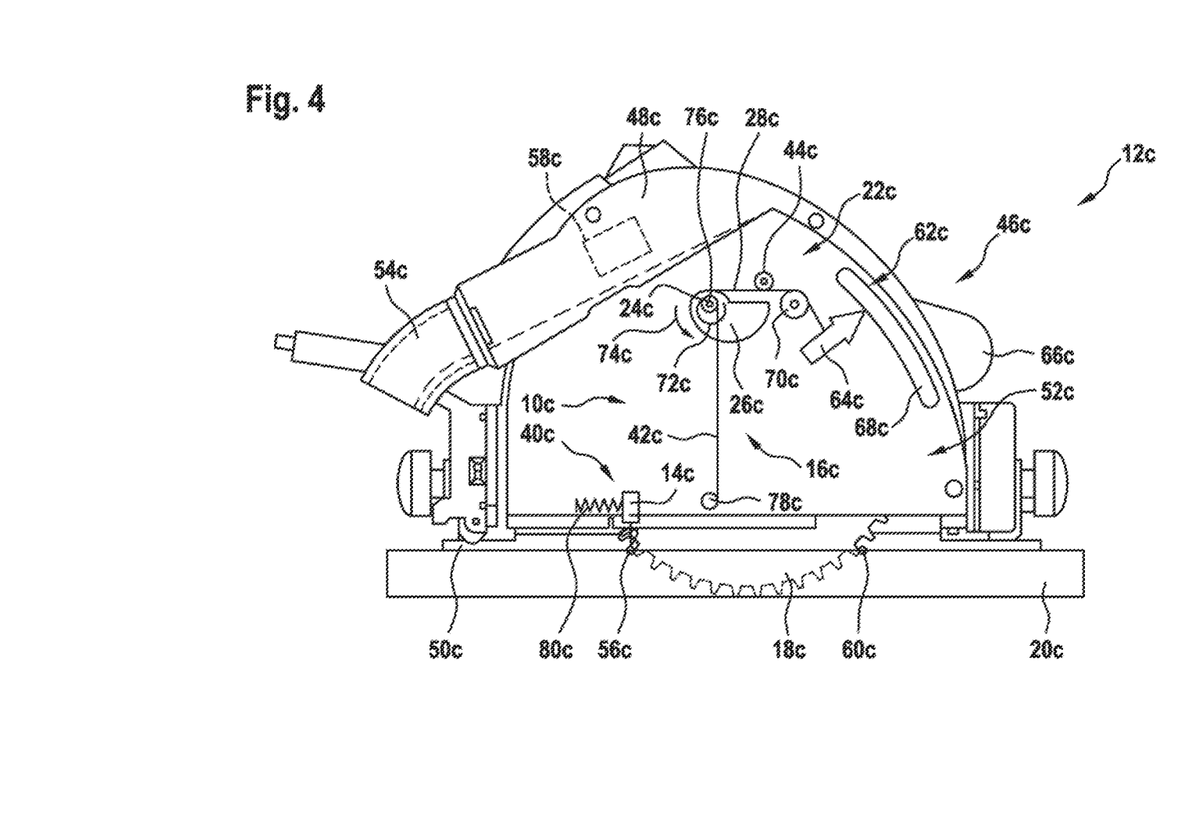
FIG. 4 shows a simplified illustration of a power tool having an alternative cutting length display apparatus having a cable system unit.

FIGS. 3 and 4 illustrate alternative exemplary embodiments. Components, features and functions that substantially remain the same are indicated in principle with the same reference signs. To differentiate the exemplary embodiments, the letters a to c are added to the reference signs in the exemplary embodiments. The following description is limited substantially to the differences from the first exemplary embodiment described in FIGS. 1 and 2, wherein reference can be made to the description of the first exemplary embodiment in FIGS. 1 to 4 with respect to components, features and functions that remain the same. In the exemplary embodiments of FIGS. 3 and 4, the letter a has been replaced by the letters b and c.

FIG. 3 shows an alternative configuration of a cam element 26b of a cable system unit 22b. The cam element 26b has an in particular Archimedean spiral track 38b, along which a pull cable 28b of the cable system unit 22b is guided sectionally. The pull cable 28b is provided to induce a rotational movement of the cam element 26b by unwinding along a cam surface 30b of the cam element 26b. At least two points on the cam surface 30b of the cam element 26b have different distances from the axis of rotation 24b for obtaining a change in a rotational speed of the cam element 26b during a uniform movement of the pull cable 28b.

FIG. 4 shows a portable power tool 12c, which is configured as a plunge saw and comprises at least one cutting depth setting unit 46c for setting a cutting depth of a machining tool 18c and at least one cutting length display apparatus 10c. The portable power tool 12c has an at least substantially analogous configuration to the portable power tool 12a described in FIGS. 1 and 2. The cutting length display apparatus 10c for the portable power tool 12c has at least one display unit 16c, comprising at least one movably mounted display element 14c, for displaying at least one position of a cutting edge of the machining tool 18c on the workpiece 20c to be machined in dependence on a set cutting depth of the machining tool 18c. The cutting depth of the machining tool 18c is settable using the cutting depth setting unit 46c. The display unit 16c preferably has at least one further movably mounted display element (not illustrated here), which is provided for displaying in at least one operating state at least one position of a further cutting edge of the machining tool 18c. The further display element is preferably configured to be at least substantially identical to the display element 14c. The display unit 16c is configured as a laser display unit. The display element 14c is configured as a laser display element. The display element 14c images in at least one operating state a cutting edge display line 56c, which extends at least substantially transversely to a cutting plane of the machining tool 18a, on the workpiece 20a to be machined for displaying the position of the cutting edge. The cutting edge display line 56c of the display element 14c is formed here by a laser line. The display element 14c is supplied with energy by an energy unit 58c of the cutting length display apparatus 10c or of the portable power tool 12c for producing a laser beam. The energy unit 58c can be formed here by a separate battery pack, or the energy unit 58c is electrically connected electrically to an energy supply unit (not illustrated in more detail here) of the portable power tool 12c. The cutting length display apparatus 10c has a guide unit 40c, with said display element 14c being mounted so as to be displaceable along it.

The cutting edge display line 56c, which is imaged on the workpiece 20c by the display element 14c, is provided here for displaying a position of a rear cutting edge of the machining tool 18c on the workpiece 20c to be machined, as viewed in a direction that extends counter to a movement direction of the portable power tool 12c for making a cut in the workpiece 20c. The rear cutting edge of the machining tool 18c corresponds to a rear exit edge of cutting edges of the machining tool 18c from the workpiece 20c to be machined when a cutting depth of the machining tool 18c that is set using the cutting depth setting unit 46c has been reached. A cutting edge display line 60a, which is imaged on the workpiece 20c by the further display element, can in particular be provided for displaying a position of a front cutting edge of the machining tool 18c on the workpiece 20c to be machined, as viewed in the direction that extends counter to the movement direction of the portable power tool 12c for making a cut in the workpiece 20c. The front cutting edge of the machining tool 18c corresponds to a front entry edge of cutting edges of the machining tool 18c in the workpiece 20c to be machined when a cutting depth of the machining tool 18c that is set using the cutting depth setting unit 46c has been reached.

The cutting length display apparatus 10c furthermore has a cable system unit 22c, which is provided for changing a pose of the display element 14c in dependence on the set cutting depth of the machining tool 18c. The cable system unit 22c has at least one cam element 26c, which is mounted so as to be rotatable about an axis of rotation 24c, and at least one pull cable 28c, which is provided for inducing a rotational movement of the cam element 26c by unwinding along at least one cam surface 30c of the cam element 26c. The cam element 26c has applied to it a restoring force 74, acting counter to a pull direction of the pull cable 28c, by a restoring element 72c. The rotational movement of the cam element 26a is provided for effecting change in the pose of the display element 14c. At least two points on the cam surface 30c of the cam element 26c have different distances from the axis of rotation 24c for obtaining a change in a rotational speed of the cam element 26c during a uniform movement of the pull cable 28c. The pull cable 28c is guided at least sectionally over an outer contour 32c of the cam element 26c, which has different outer radii 36c in at least one section 34c (cf. FIG. 2). Alternatively, a cam element 26c with a spiral track 38c (cf. FIG. 3) can be provided. The cable system unit 22c furthermore has at least one further pull cable 42c, which is provided for converting a rotational movement of the cam element 26c into a movement of the display element 14c along the guide unit 40c. The further pull cable 42c is provided to be wound up onto a reel 76c which is connected to the cam element 26c for rotation therewith or to be unwound from the reel 76c upon a rotational movement of the cam element 26c. The further pull cable 42c is connected by one end to the display element 14c. The further pull cable 42c is deflected between the reel 76c and the display element 14c using a deflection pulley 78c such that it extends parallel to the guide unit 40c. The display element 14c has applied to it a force, which acts counter to a pull force of the further pull cable 42c, by a spring 80c. In addition, the cable system unit 22c has a tensioning pulley 44c, which is provided for varying a pull length of the pull cable 42c, as a result of which the display unit 16c can be adapted to machining tools 18c having different diameters.

The cutting length display apparatus 10a furthermore comprises a movement coupling unit 62a, which connects the cable system unit 22a of the display unit 16a to a cutting depth setting element 66a of the cutting depth setting unit 46a in a movement-dependent manner. One end of the pull cable 28a is connected to a movement coupling element 64a of the movement coupling unit 62a. The pull cable 28c is deflected between the cam element 26a and the movement coupling element 64a using a deflection pulley 70a. The cutting depth setting element 66a is mounted movably on a guide track element 68a of the cutting depth setting unit 46a for setting a cutting depth of the machining tool 18a. The guide track element 68a is arranged at the protection unit 52a. In the case of a movement of the cutting depth setting element 66a relative to the guide track element 68a, the movement coupling element 64a is likewise moved, due to the connection to the cutting depth setting element 66a, relative to the guide track element 68a along a profile of the guide track element 68a, as a result of which a movement of the pull cable 28a is effected. The movement of the pull cable 28a results in a rotational movement of the cam element 26a and an associated winding up or winding down of the second pull cable 42c, as a result of which a translational movement of the display element 14c along the guide unit 40c is effected. Displacement of the further display element can be implemented in the same way.

Alternatively, a display of a position of a cutting edge of a machining tool on a workpiece to be machined in dependence on a set cutting depth of the machining tool can be effected using a directly pivotable laser display element. In particular, the laser display element can be mounted so as to be rotatable about an axis of rotation. The laser display element can in particular be pivoted about the axis of rotation in dependence on a setting of a cutting depth setting unit for example using an electric motor.

The invention claimed is:

1. A cutting length display apparatus for a portable power tool, comprising:
   at least one display unit including at least one movably mounted display element configured to display at least one position of a cutting edge of a machining tool on a workpiece configured to be machined based on a set cutting depth of the machining tool; and
   a cable system unit configured to change a pose of the at least one display element based on the set cutting depth of the machining tool.

2. The cutting length display apparatus as claimed in claim 1, wherein the cable system unit includes:
   at least one cam element including at least one cam surface, the at least one cam element mounted so as to be rotatable about an axis of rotation; and
   at least one pull cable configured to induce a rotational movement of the at least one cam element via unwinding along the at least one cam surface.

3. The cutting length display apparatus as claimed in claim 2, wherein the rotational movement changes the pose of the at least one display element.

4. The cutting length display apparatus as claimed in claim 2, wherein at least two points on the at least one cam surface are located at different distances from the axis of rotation, such that a change in a rotational speed of the at least one cam element occurs during a uniform movement of the at least one pull cable.

5. The cutting length display apparatus as claimed in claim 2, wherein the at least one pull cable is guided, at least sectionally, over an outer contour of the at least one cam element having different outer radii in at least one section.

6. The cutting length display apparatus as claimed in claim 2, wherein the at least one display element is connected to the at least one cam element for rotation therewith.

7. The cutting length display apparatus as claimed in claim 2, further comprising:
   at least one guide unit,
   wherein the at least one display element is mounted so as to be displaceable along the at least one guide unit.

8. The cutting length display apparatus as claimed in claim 7, wherein the cable system unit further includes at least one further pull cable configured to convert the rotational movement of the at least one cam element into a movement of the at least one display element along the at least one guide unit.

9. The cutting length display apparatus as claimed in claim 8, wherein the cable system unit further includes at least one tensioning pulley configured to vary a pull length of the at least one further pull cable.

10. The cutting length display apparatus as claimed in claim 1, wherein the at least one display unit (16a; 16b; 16c) is a laser display unit.

11. A portable power tool, comprising:
    at least one cutting length display apparatus including:
       at least one display unit including at least one movably mounted display element configured to display at least one position of a cutting edge of a machining tool on a workpiece configured to be machined based on a set cutting depth of the machining tool; and
       a cable system unit configured to change a pose of the at least one display element based on the set cutting depth of the machining tool.

* * * * *